(12) United States Patent
Campbell et al.

(10) Patent No.: US 6,836,553 B2
(45) Date of Patent: Dec. 28, 2004

(54) KEY IDENTIFICATION SYSTEM

(75) Inventors: John Campbell, Chandler, AZ (US); George Heredia, Paradise Valley, AZ (US); Michael A. Mueller, Phoenix, AZ (US)

(73) Assignee: The Hillman Group, Inc., Cincinnati, OH (US)

( * ) Notice: Subject to any disclaimer, the term of this patent is extended or adjusted under 35 U.S.C. 154(b) by 0 days.

(21) Appl. No.: 09/962,131

(22) Filed: Sep. 26, 2001

(65) Prior Publication Data

US 2002/0031251 A1 Mar. 14, 2002

Related U.S. Application Data

(63) Continuation-in-part of application No. 09/625,274, filed on Jul. 25, 2000.

(51) Int. Cl.[7] .................................................. G06K 9/00
(52) U.S. Cl. ....................................... 382/100; 382/209
(58) Field of Search ............................... 382/100, 152, 382/181, 190, 209, 217–218, 305, 309; 409/81, 82, 83, 96, 93

(56) References Cited

U.S. PATENT DOCUMENTS 4,899,391 A * 2/1990 Cimino et al. .............. 382/100
6,064,747 A * 5/2000 Wills et al. ................. 382/100
6,065,911 A * 5/2000 Almblad et al. ............. 409/83
6,185,311 B1 * 2/2001 Yanovsky et al. ........... 382/100
6,449,381 B1 * 9/2002 Yanovsky et al. ........... 382/100

FOREIGN PATENT DOCUMENTS

ES 2 017 240 A 1/1991

OTHER PUBLICATIONS

European Search Report for European Patent Application No. 01117549.4 (claiming priority to U.S. Appl. No. 09/625,274) dated Jun. 1, 2004.
Gerblich, K.: "Ins Rechte Licht Geruckt" ELEKTRONIC, Munchen, DE; vol. 41, No. 9 Apr. 28, 1992, pp. 106–111.

* cited by examiner

Primary Examiner—Daniel Mariam
(74) Attorney, Agent, or Firm—Finnegan, Henderson, Farabow, Garrett & Dunner, LLP

(57) ABSTRACT

A method and system for identifying a key blank corresponding to a master key is provided. The system includes a housing. A first source of uniform light is fixed relative to the housing. A second source of uniform light is fixed relative to the housing and is disposed opposite the first source of uniform light such that the master key is disposable therebetween. The first and second sources of uniform light are operable to generate an image of the master key. A receiver captures the image of the master key. A control having a memory configured to store information on a plurality of key blanks identifies the key blank corresponding to the master key based on the captured image.

20 Claims, 8 Drawing Sheets

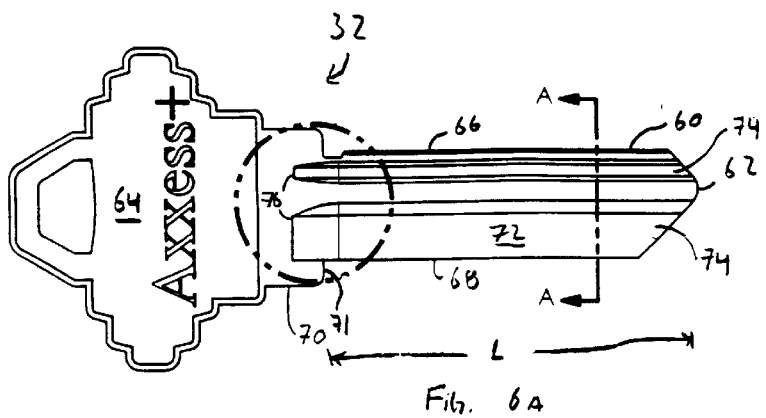 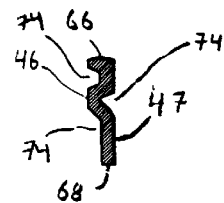
Fig. 6A
Fig. 6B
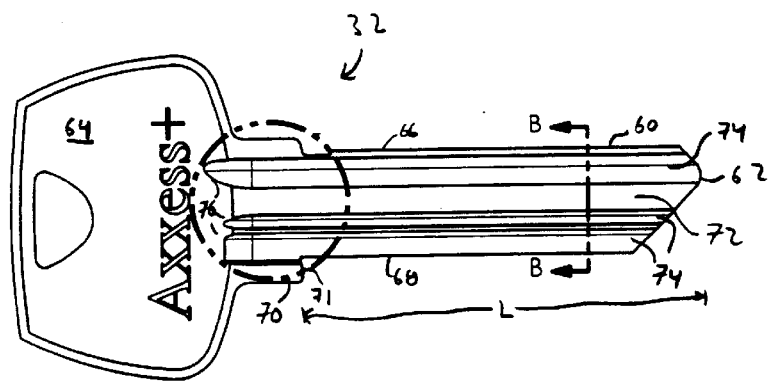 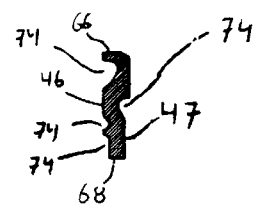
Fig. 7a
Fig. 7b
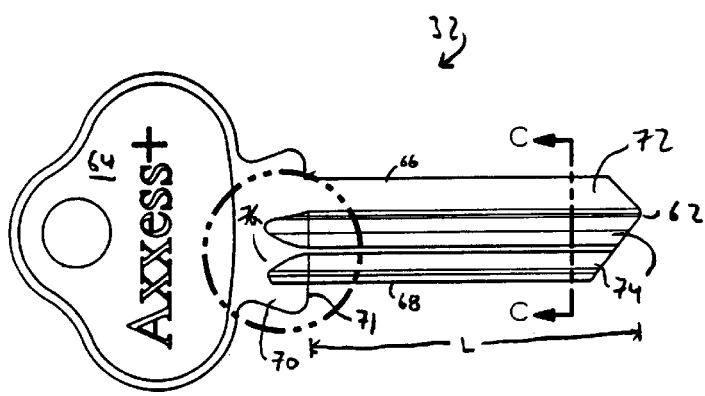 
Fig. 8a
Fig. 8b

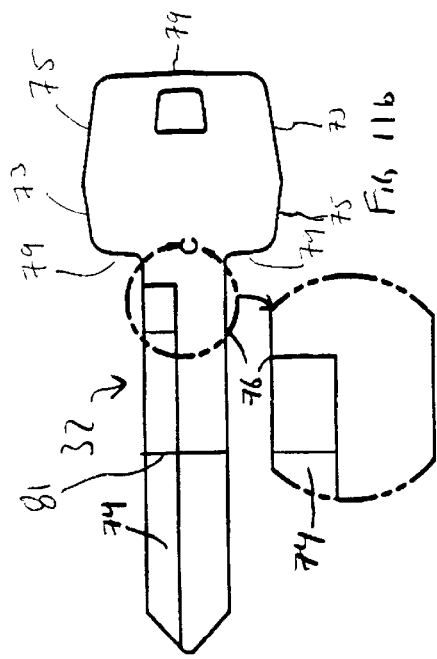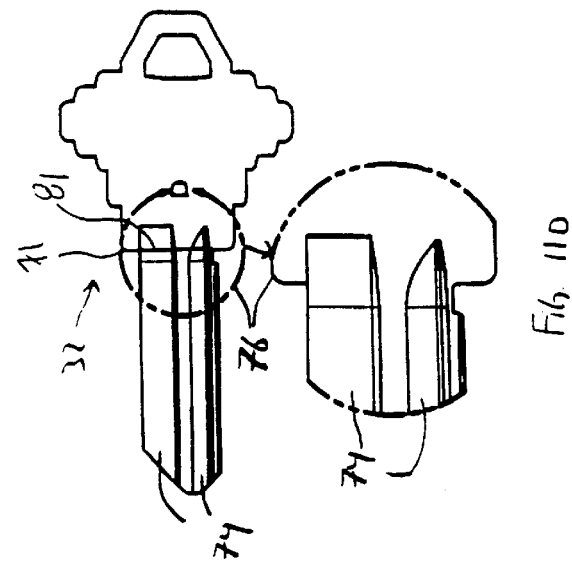
FIG. 11b
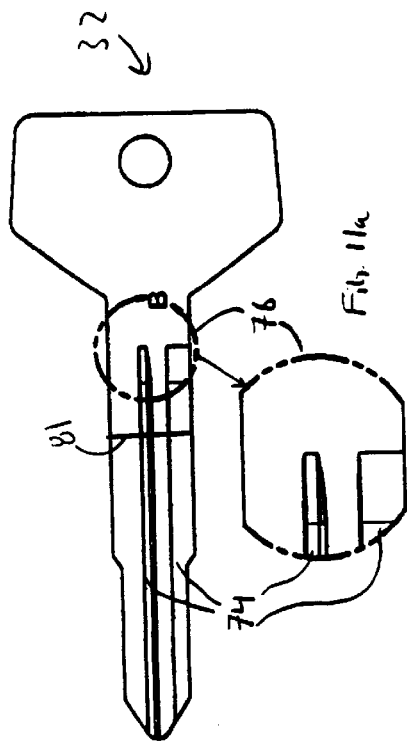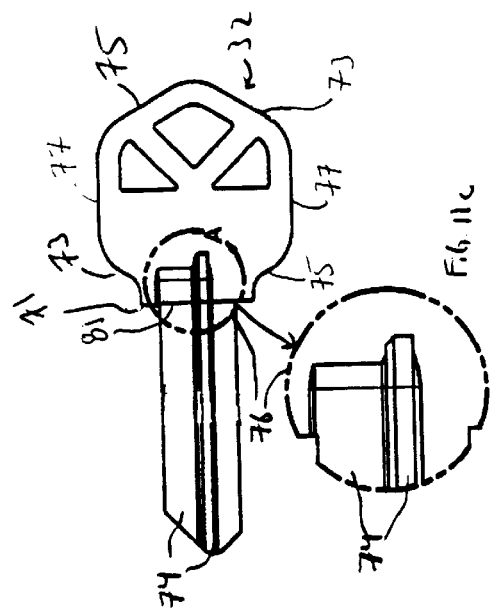
FIG. 11a
FIG. 11c

KEY IDENTIFICATION SYSTEM

RELATED APPLICATIONS

This application is a continuation-in-part of application Ser. No. 09/625,274 filed on Jul. 25, 2000 for Key Identification System.

BACKGROUND OF THE INVENTION

This invention generally relates to a system for identifying a key. More particularly, the present invention relates to a system for identifying the key blank that corresponds to a master key.

There are many circumstances in which a key owner may desire to obtain a copy of a key. For example, the key owner would need to replace a key after the key has undergone significant use and the cuts and notches on the key blade have worn to a point where the key can no longer effectively operate the corresponding lock. A key owner may also desire to create a duplicate key to replace a lost key or simply to obtain an extra key.

To reproduce a key, the type, or style, of key blank used in the master key must be identified from the numerous types of key blanks available in the market. In addition to identifying the appropriate key blank, the cuts, or notches, in the blade of the key may be identified. After the key blank and the key cuts are identified, a key blank corresponding to the master key may be positioned in a clamp and a cutting mechanism employed to reproduce the notches in the blade. The end result of this process is a key that is a reproduction of the original master key.

Each different type, or style, of key blank has different features that uniquely identify the key blank. These features include the head shape, blade length, milling locations and depths, and the number of cut edges (i.e. whether the key is one-sided or two-sided). To identify the appropriate key blank, this information is extracted from the master key and compared to known key blanks. A key blank can be identified when each of the features of the master key is matched to a particular key blank. This comparison process may be performed manually or with an automated identification device. The currently known automated key identification machines extract this information from a master key through a combination of two processes: back lighting and light striping.

In a back lighting process, a light source and a camera are positioned on opposite sides of a master key so that the light from the light source forms a profile of the key for the camera to capture. The captured profile is digitized and the results are analyzed by a processor to extract information about the master key. This back lighting process can reveal information about the head shape, blade length, and whether the key is one-sided or two-sided. However, information about the shape of the key blade surface, such as the location and depth of any grooves or millings, cannot be determined from the profile of the master key. Thus, the back lighting process alone is unable to extract all of the information about the master key needed to identify the key.

The process of light striping will reveal the information that can not be obtained in the back lighting process. In the light striping process, a generally planar beam of light is directed at an angle against the blade of the key. The beam of light is then moved along the length of the key blade, either by moving the key relative to the light stripe and camera or by moving the light stripe and camera relative to the key. The image created by the intersection of the light stripe and the blade surface is captured by a camera. Because of the angle of intersection of the light stripe and the key blade and the differing depths of the key blade surface due to the millings or grooves, the image captured by the camera will be non-linear. This non-linear image may be digitized and analyzed to determine the location and depth of the grooves or millings on the key blade surface.

Key identification machines that identify a key with the light striping and back lighting processes are typically complex machines as they must include the moving parts and multiple lighting sources needed to both back light and light stripe the key blade. In addition, a bright light source, such as a laser, is typically required to generate the light stripe. The use of a laser necessitates that certain safety precautions, such as laser shielding, be included in the light striping device.

In addition, imperfections or dirt on the surface of the key blade can result in glares or shadows under the harsh light of a laser generated light stripe. These glares and shadows are captured as part of the camera image of the light stripe and can reduce the accuracy of the key identification process.

Another problem with known light striping machines is that the master key must be accurately positioned with respect to the light stripe to obtain an accurate identification of the master key. For the light striping process to work, the user must place the key blade perpendicular to the light stripe generator. Any other positioning will result in a distorted non-linear image. If the alignment of the key is too far off from perpendicular, the distortion of the non-linear will prevent an accurate identification of the key blank.

In light of the foregoing, there is a need for an improved key identification system that (1) has a reduced number of moving parts; (2) is easy to use; and (3) has improved accuracy and speed of key identification.

SUMMARY OF THE INVENTION

Accordingly, the present invention is directed to a system for identifying keys that obviates one or more of the limitations and disadvantages of prior art key identification devices. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a system for identifying a key blank from a master key. The system includes a housing. A first source of uniform light is fixed relative to the housing. A second source of uniform light is fixed relative to the housing and is disposed opposite the first source of uniform light such that a master key is disposable therebetween. The first and second sources of uniform light are operable to generate an image of the master key. A receiver captures the image of the master key. A control having a memory configured to store information on a plurality of key blanks identifies the key blank corresponding to the master key based on the captured image.

In another aspect, the present invention is directed to a method of identifying a key blank from a master key. A housing having a first source of uniform light and a second source of uniform light fixed therein is provided. A master key is positioned between the first source of uniform light and the second source of uniform light. At least one side of the master key is illuminated with one of the first and second sources of uniform light. The image of the master key generated by the one of the first and second sources of uniform light is captured. The captured image of the master key is compared with information from known key blanks to identify a key blank corresponding to the master key.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate an embodiment of the present invention and together with the description, serve to explain the principles of the invention. In the drawings.

FIG. 6a is a top view of an exemplary master key (without bitting pattern);

FIG. 6b is a cross sectional view of the master key of FIG. 6a taken along line A—A;

FIG. 7a is a top view of another exemplary master key (without bitting pattern);

FIG. 7b is a cross sectional view of the master key of FIG. 7a taken along line B—B;

FIG. 8a is a top view of another exemplary master key (without bitting pattern);

FIG. 8b is a cross sectional view of the master key of FIG. 8a taken along line C—C;

FIGS. 11a–11d are top views of exemplary key blanks, illustrating the respective milling exit pattern of the key blanks.

DETAILED DESCRIPTION

Figure 1:
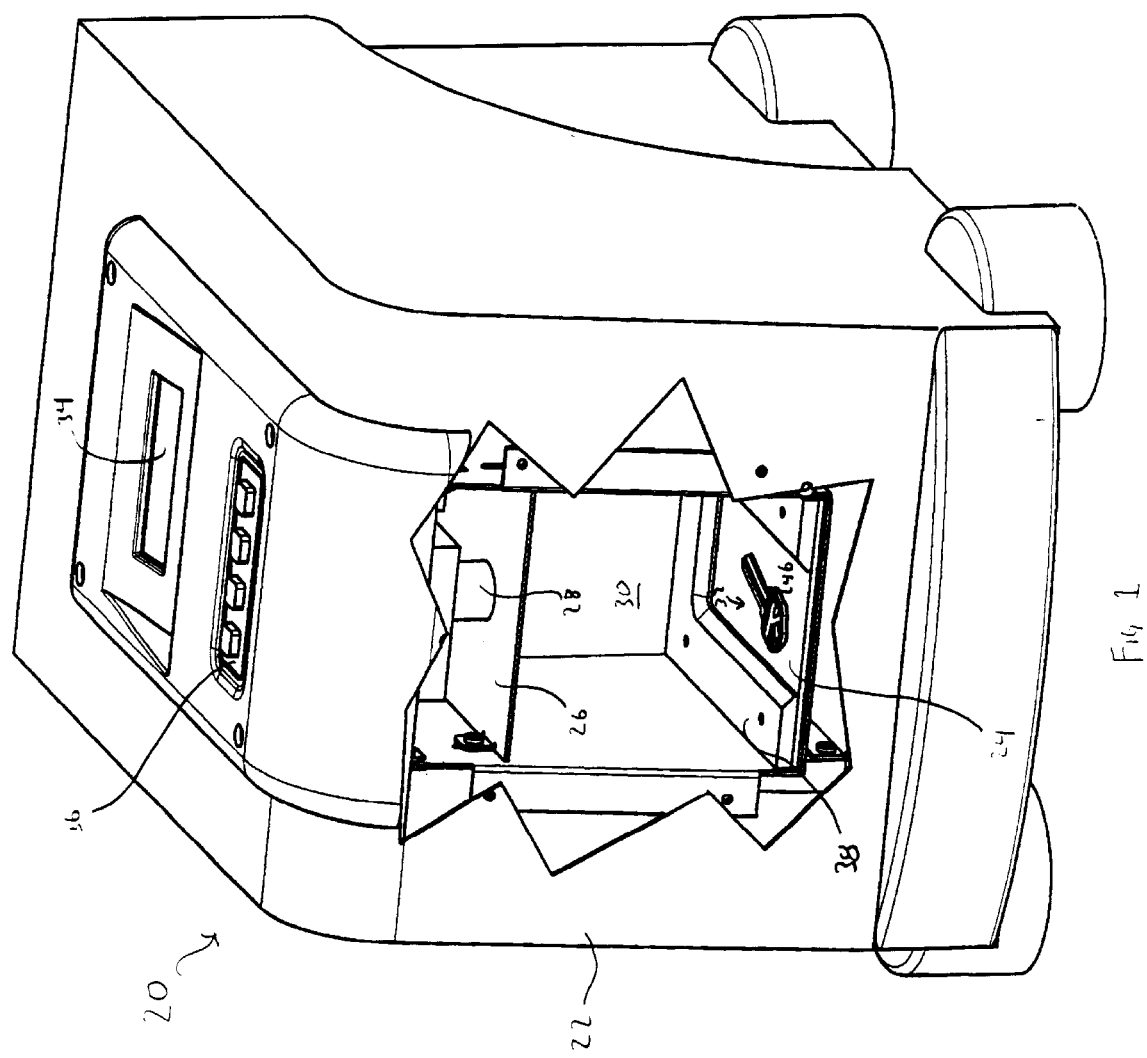
FIG. 1 is a perspective view of a key identification system in accordance with the present invention.

Reference will now be made in detail to the presently preferred embodiments of the present invention, examples of which are illustrated in the accompanying drawings. Wherever possible, the same reference numbers will be used throughout the drawings to refer to the same or like parts. An exemplary embodiment of a system for identifying a master key according to the present invention is shown in FIG. 1 and is designated generally by reference number 20.

Key blanks are made in a variety of sizes and shapes, each of which is configured to ultimately operate a particular type of lock. To identify the key blank corresponding to a master key, the master key must be analyzed to obtain identifying information about the master key that will uniquely identify the corresponding key blank.

FIGS. 6a, 7a, and 8a illustrate several exemplary master keys. For purposes of simplicity, the master keys are illustrated without a bitting pattern. As shown, each master key 32 has a head 64, a shoulder area 70, and a blade 72. The size and shape of key head 64 and shoulder area 70 are features of the master key 32 that are useful in identifying the corresponding key blank.

Blade 72 of master key 32 has a length L and includes a first edge 66 and a second edge 68. Master key 32 may include cuts or notches in one or both of the first and second edges 66 and 68. A key with cuts in one edge is considered a single-sided key, whereas a key with cuts in both edges is considered a double-sided key. The blade length L and the number of cut edges are additional features of the master key that are useful in identifying the corresponding key blank.

As illustrated in FIGS. 6b, 7b, and 8b, blade 72 of master key also includes a first side 46 and a second side 47. Each side 46 and 47 typically includes millings 74, or grooves, that further define the key blank. These millings are designed to correspond to the shape of a key receptacle in a particular lock. A milling exit pattern 76 is formed in the shoulder area 70 and head 64 when the millings 74 are formed in the blade. The number, location, and depth of millings 74 and the resulting shape of milling exit pattern 76 on the key blade are additional features of the master key that are useful in identifying the key blank that corresponds to the master key.

By comparing information about the head, shoulder, and blade of the master key to similar information about known key blanks, the key blank corresponding to the master key may be identified. Some features, such as the head shape and blade length, may be common across a number of different styles of key blank and, therefore, cannot be used alone to uniquely identify the key blank. However, this information is easy to compare to known key blanks and can be used to reduce the number of potential key blank matches that warrant additional comparison with the remainder of the master key information.

In accordance with the present invention, there is provided a system for identifying a key blank corresponding to a master key. The system includes a first source of uniform light and a second source of uniform light. For the purposes of the present disclosure, the phrase "source of uniform light" is intended to include all light sources that are capable of evenly illuminating the surface of an object. This even, or uniform, illumination of the object surface will prevent "hot spots" or glare that typically accompanies a single "point" light source, such as a light bulb or laser. The first and second sources of uniform light may be, for example, a luminous surface, a single light bulb with a diffuser or lens, or a series of light bulbs with a diffuser or lens. The combination of the diffuser or lens with the light bulb will create an even distribution of light on the surface of the master key, thereby preventing hot spots or glare on the surface of the master key.

The first and second sources of uniform light are disposed opposite one another such that the master key is disposable therebetween. The first and second sources of uniform light are operable to generate an image of the master key. In the preferred embodiment, the first and second sources of uniform light are luminous surfaces that include an electro-luminescent film, although the present invention contemplates that the luminous surfaces may include other luminous materials capable of generating uniform light, such as chemical and electrical luminescence.

As illustrated in FIG. 1, the key identification system 20 includes a first luminous surface 24 and a second luminous surface 26. Preferably, first and second luminous surfaces 24 and 26 are disposed within a housing 22 and are fixed relative to the housing. In the illustrated embodiment, housing 22 substantially encloses the first and second luminous surfaces 24 and 26 to provide a light tight environment in which a master key 32 may be examined. By enclosing the luminous surfaces, housing 22 prevents unwanted light from reflecting off any internal components of the key identification system. Any unwanted light that interferes with the key identification process could reduce the accuracy of the identification process.

Preferably, housing 22 contains a door (not shown) or other opening through which master key 32 may be placed in the key identification system 20. The door may be automatically opened and closed during the key identification process by a control (as described in greater detail below). Alternatively, the door may be manually opened and closed by a user.

Figure 2:
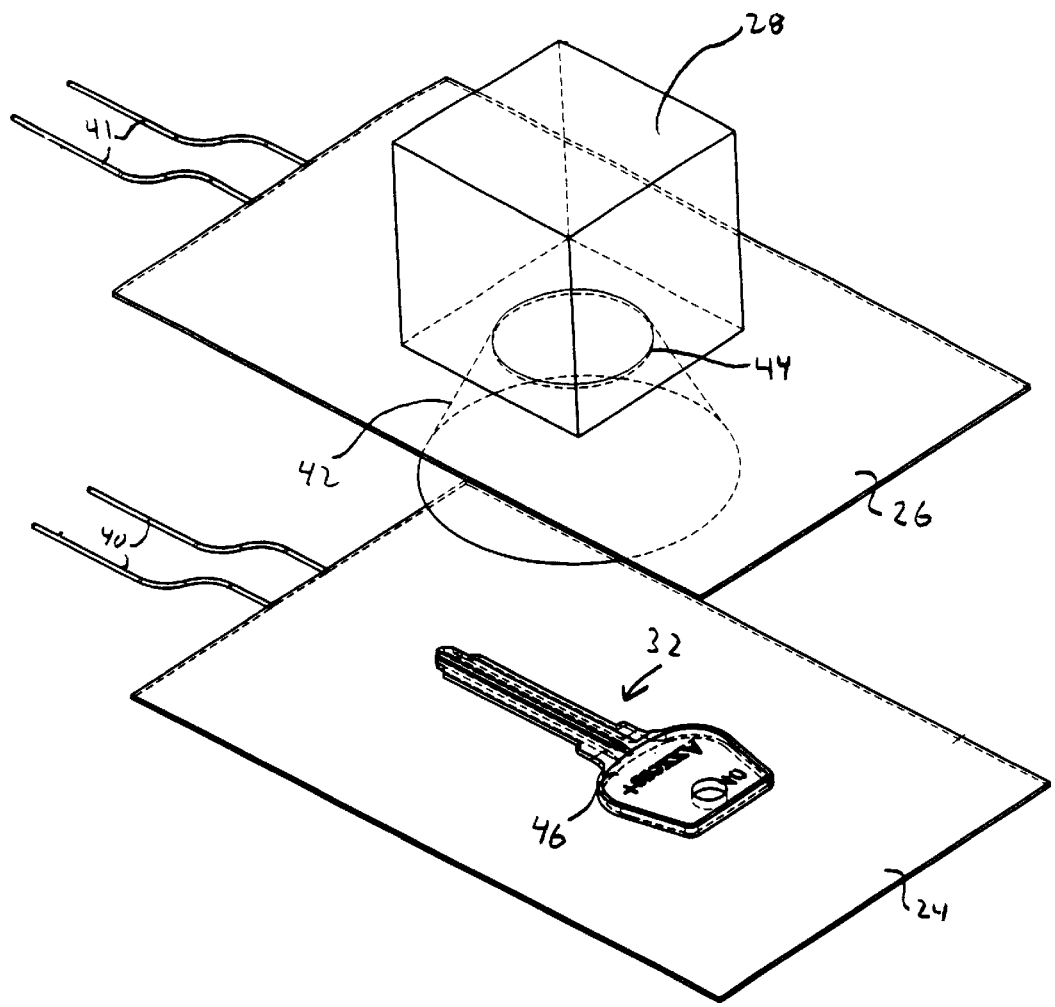
FIG. 2 is a perspective view of first and second luminous surfaces and a receiver in accordance with the present invention.

In the preferred embodiment, first and second luminous surfaces 24 and 26 include an electro-luminescent film. As illustrated in FIG. 2, first and second luminous surfaces 24 and 26 are connected to power leads 40 and 41, respectively, which are, in turn, connected to a power source (not shown). When the power source is activated, a voltage is applied to the electro-luminescent film. As is known in the art, when a voltage is applied to electro-luminescent film, the electro-luminescent film emits a uniform glow of light across the surface of the film. The brightness of the emitted glow may be varied by increasing or decreasing the voltage applied to the electro-luminescent film. In addition, adjusting the frequency of the current applied to the electro-luminescent film could also alter the brightness of the emitted glow.

Figure 3:
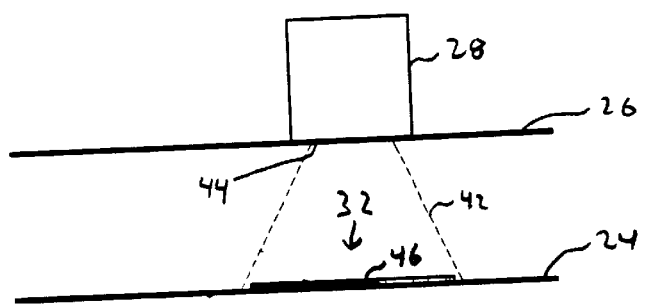
FIG. 3 is a side view of the first and second luminous surfaces and receiver of the embodiment illustrated in FIG. 2.

Preferably, as illustrated in FIGS. 1–3, first luminous surface 24 is configured to receive master key 32. It is contemplated that master key 32 may be placed directly on first luminous surface 24 or a transparent support (not shown) may be provided to receive the master key. When master key 32 is positioned on or over the first luminous surface and the power source is activated, the light emitted from the first luminous surface will back light master key 32. Viewed from a position on the opposite side of master key 32 from first luminous surface 24, the back lighting of the master key will outline the profile of the master key. The profile of the master key reveals the shape and size of the head and shoulder of the master key, as well as the length of the key blade. This back lighting process will also reveal the bitting pattern in the master key, if that is a desirable feature to extract from the master key.

As also illustrated in FIGS. 1–3, second luminous surface 26 is positioned on the opposite side of master key 32 from first luminous surface 24. When the power source is activated, the light generated by second luminous surface 26 will illuminate the unsupported surface 46 of master key 32. The uniform light generated by second luminous surface 26 will illuminate the surface of the key, including any grooves or millings in the key blade and the milling exit pattern on the key shoulder and head.

The present invention contemplates that the key identification system of the present invention may include a single luminous surface fixed in a housing. As described in greater detail below, this embodiment will allow for the accurate identification of a key blank from a master key. However, it is expected that providing two luminous surfaces will provide for a faster identification of the blank key.

In accordance with the present invention, the key identification system also includes a receiver operable to capture the image of the master key that is generated by the first and second luminous surfaces. In the preferred embodiment, the receiver is a high resolution digital camera, such as a 1288×1032 high resolution digital monochrome CCD manufactured by PixelCam and Vitana. It is contemplated, however, that a non-digital camera may be used in connection with a digitizer, which together will produce a digital signal that represents the image of the master key. The present invention also contemplates that the receiver may capture the image of the key when only the first luminous surface is activated to obtain the profile of the master key or when both luminous surfaces are activated to obtain an image of the unsupported surface of the master key.

As illustrated in FIGS. 2 and 3, receiver 28 is preferably positioned adjacent to second luminous surface 26. Second luminous surface 26 includes an opening 44 configured to allow receiver 28 to obtain an unobstructed view of master key 32. Preferably, opening 44 is as small as possible to ensure that second luminous surface 26 properly illuminates the unsupported (exposed) surface of the master key.

Opening 44 limits the viewing range of receiver 28 to a certain viewing range 42. For master key 32 to be identified, the master key 32 must be disposed within the viewing range 42 of the receiver. In the preferred embodiment, a frame 38 (referring to FIG. 1) surrounds first luminous surface 24 to limit the area in which master key 32 may be placed to the viewing area of receiver 28. This will ensure that master key 32 is placed within the viewing range of the receiver and can therefore be identified.

Preferably, the lens of receiver 28 is flush with the second luminous surface 26. Alternatively, the lens of receiver 28 may be slightly behind the second luminous surface 26. Any projection of the lens past the second luminous surface 26 could potentially interfere with the light generated by the second luminous surface and cast a shadow on the master key. Such a shadow could reduce the accuracy of the key identification process. However, the further the lens moves away from the surface of the second luminous surface 26, the more the viewing angle of the receiver is restricted. Thus, the largest viewing area is obtained when the lens of receiver is flush with the surface of the second luminous surface.

Receiver 28 is configured to capture different images of master 32 during the key identification process. The different images of master key 32 are generated by varying the amount of light generated by each of the first and second luminous surfaces and by selectively activating or de-activating the first and second luminous surfaces. It is contemplated that generating a variety of different images may be useful in identifying the key blank from the master key.

For example, one image of master key 32 that is useful in identifying the key blank is a back lit image of the master key. The back lit image is generated by activating first luminous surface 24 without activating second luminous surface 26. The body of master key 32 blocks some of the illumination generated by the first luminous surface. The receiver captures the illumination that passes by the master key, which will define the shape of the master key. The receiver captures the image as a set of differently colored pixels. The darker pixels identify the location of the master key and the point at which the pixels change from darker to lighter indicates the location of the edge of the key. This image may be analyzed to determine the shape of the silhouette, or profile, of the master key.

A second useful image in identifying a key blank is a top lit image of the master key. This image can be generated by activating both first and second luminous surfaces 24 and 26. Master key 32 will block a portion of the illumination generated by first luminous surface 24 and will reflect a portion of the illumination generated by second luminous surface 26. The resulting image captured by receiver 28 will include a set of differently colored pixels that define the surface of master key 32. The top lit image will include lines of darker colored pixels that indicate the location of millings 74 on key blade 72. The top lit image may be analyzed to determine the location and width of millings 74 on key blade 72 as well as milling exit shape pattern 76.

Figure 4:
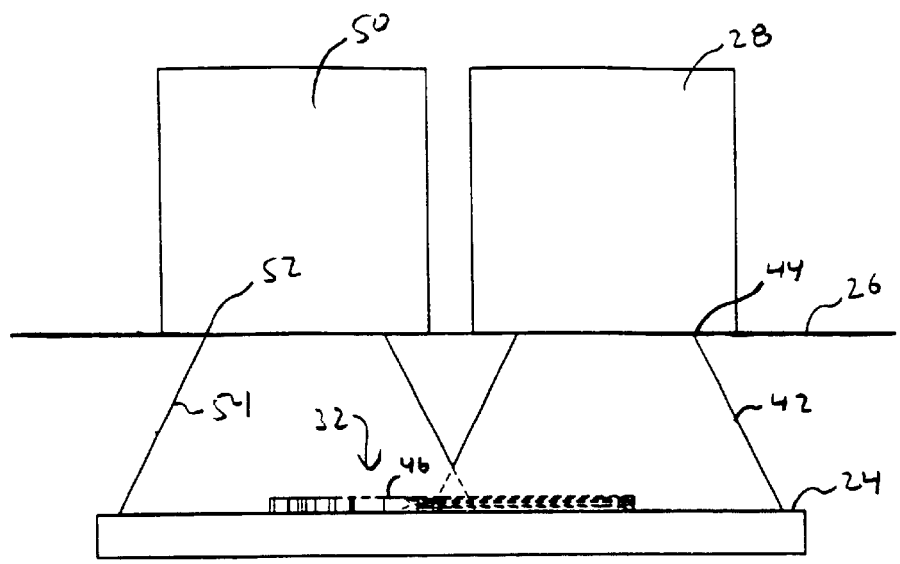
FIG. 4 is a side view of another embodiment of first and second luminous surfaces and a receiver in accordance with the present invention.
Figure 5:
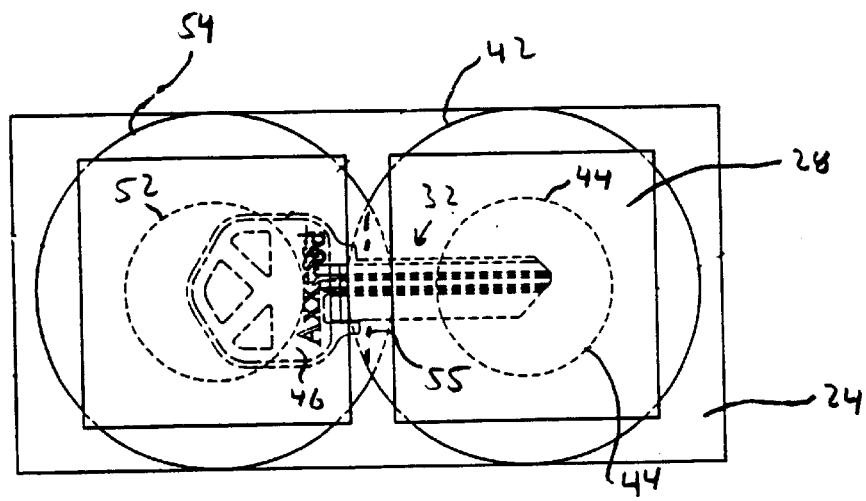
FIG. 5 is a sectional view of the first and second luminous surfaces and receiver of the embodiment illustrated in FIG. 4.

An alternative embodiment of the receiver is illustrated in FIGS. 4 and 5. In this embodiment, a second receiver 50 is disposed adjacent receiver 28 and aligned with a second opening 52 in the second luminous surface 26. The lens of second receiver 50 is also disposed flush with, or slightly back from, second luminous surface 26. This configuration provides second receiver 50 with a viewing range 54 of at least a part of master key 32.

Preferably, second receiver 50 is positioned such that the viewing range 54 of the second receiver 50 overlaps viewing range 42 of receiver 28. Thus, receiver 28 will capture an image of a first part of master key 32 and second receiver 50 will capture and image of a second part of the master key. The images captured by receiver 28 and second receiver 50 can be combined to create a complete image of the master key, from which the key may be identified, as described in greater detail below.

Preferably, first luminous surface 24 includes reference marks 55 to aid in combining the images of the key captured by receiver 28 and second receiver 50. These reference marks have a width equal to the width of a pixel. Reference marks 55 are placed within the overlap of the viewing ranges 42 and 52. Thus, each receiver captures reference marks 55 along with a portion of master key 32. The reference marks 55 are used when the two separate images are combined to form a single image of the master key and ensure that the image of the key is properly combined.

The dual receiver embodiment can provide for a more compact key identification system. Because the viewing area of the two receivers can be combined to form a complete image of the master key, the distance between the master key and the two receivers can be reduced to less than that required by a single receiver to capture the entire image of the master key. Thus, the height of the identification system may be reduced by employing an additional receiver.

In accordance with the present invention, the key identification system includes a control having a memory operable to store information on a plurality of key blanks. The control receives the digitized image of the master key from the receiver and analyzes the image to extract identifying information from the master key. The control compares the master key information to information about known key blanks to determine the key blank that corresponds to the master key.

Figure 9:
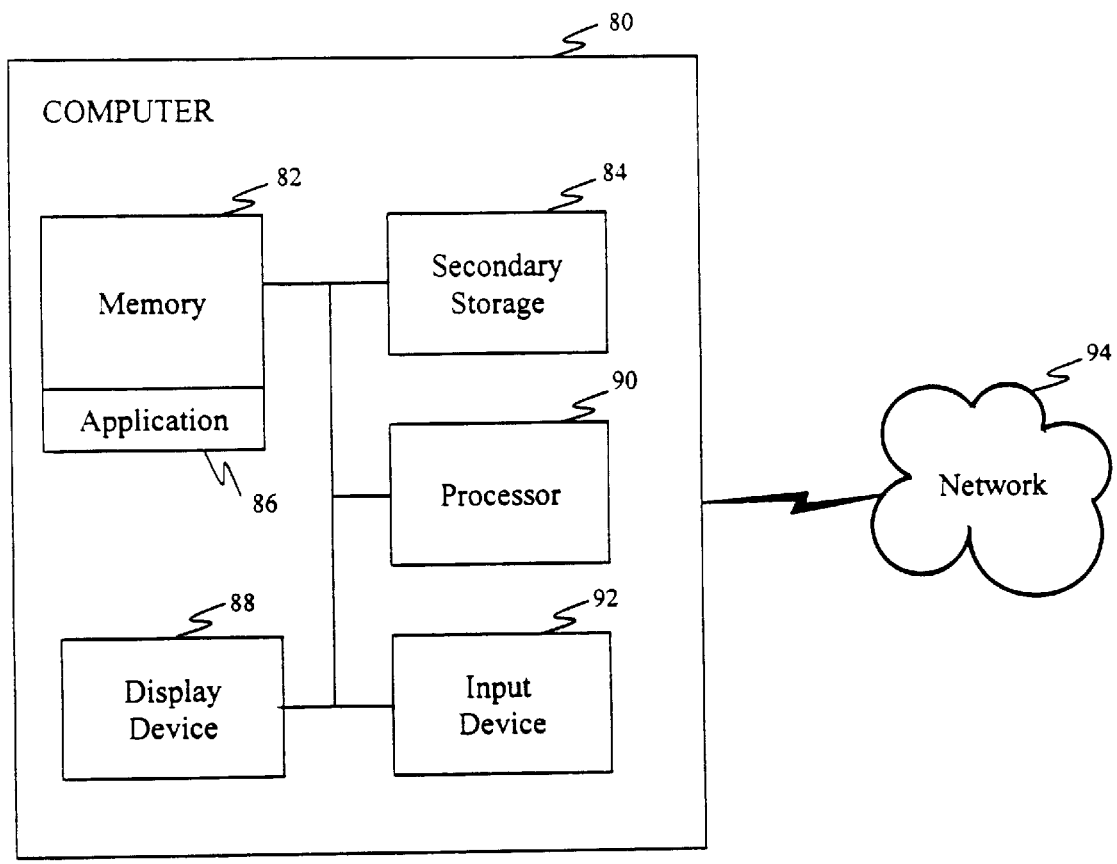
FIG. 9 is a schematic diagram of a computer suitable for controlling the operation of the key identification system of the present invention.

Preferably, the control includes a device, such as computer 80 (referring to FIG. 9), to control the operation of the key identification system. Computer 80 includes a memory 82, a secondary storage device 84, a processor 90 such as a central processing unit, an input device 92, and a display device 88. Computer 80 is optionally connected to a network 94, such as the Internet.

Memory 82 and secondary storage 84 may store applications, such as application 86, or information for execution and use by processor 90. In particular, memory 82 stores information about known types of key blanks. The stored information includes all relevant information about each key blank, such as the head shape, blade length, number of cut edges, depth and location of millings, and the milling exit pattern. Preferably this information is stored in a manner that provides for efficient searches of the features of the key blank. The present invention contemplates that key blank information may also be stored in an external memory and accessed through a network or over the Internet.

The present invention contemplates that memory 82 may be periodically updated with information on new types of key blanks. These updates may take place through a floppy disk, a CD-Rom, or other known techniques. In addition, updates may be delivered to computer 80 via the Internet.

Although computer 80 is depicted with various components, one skilled in the art will appreciate that this computer can contain additional or different components. Additionally, although computer 80 is shown connected to network 94, computer 80 may be connected to other networks, including other wide area networks or local area networks. Furthermore, although aspects of the present invention are described as being stored in memory, one skilled in the art will appreciate that these aspects can also be stored on or read from other types of computer program products or computer-readable media, such as secondary storage devices: including hard disks, floppy disks, or CD-ROM; a carrier wave from a network such as the Internet; or other forms of RAM or ROM. These aspects of the present invention may also include modules, implemented in software, hardware, or a combination, configured to perform a particular method implementing an embodiment consistent with the present invention. In addition, the computer-readable media may include instructions for controlling a computer system, such as computer 80, to perform a particular method.

In the preferred embodiment, the control governs the entire operation of the key identification system. Preferably, the control system operates to selectively activate one or both of the first and second luminous surfaces 24 and 26 and to adjust the power source to vary the voltage applied to the first and second luminous surfaces. Thus, the control may selectively adjust the brightness of the luminous surfaces and control whether the key is back lit or top lit.

The display device 88 of computer 80 is preferably a LCD display 34 (referring to FIG. 1) that is visible outside housing 22. It is contemplated that alternative display devices, such as, for example, computer monitors, may be used. The control may display messages on LCD display 34 to provide instructions or messages to the user during the identification process. In addition, the control may display the results of the key identification process on LCD display 34.

Input device 92 of computer 80, preferably includes a series of buttons 36 (referring to FIG. 1) that are accessible outside housing 22. The user may utilize these buttons to start the identification process or to input information into the computer in response to a prompt from the control.

Figure 10A:
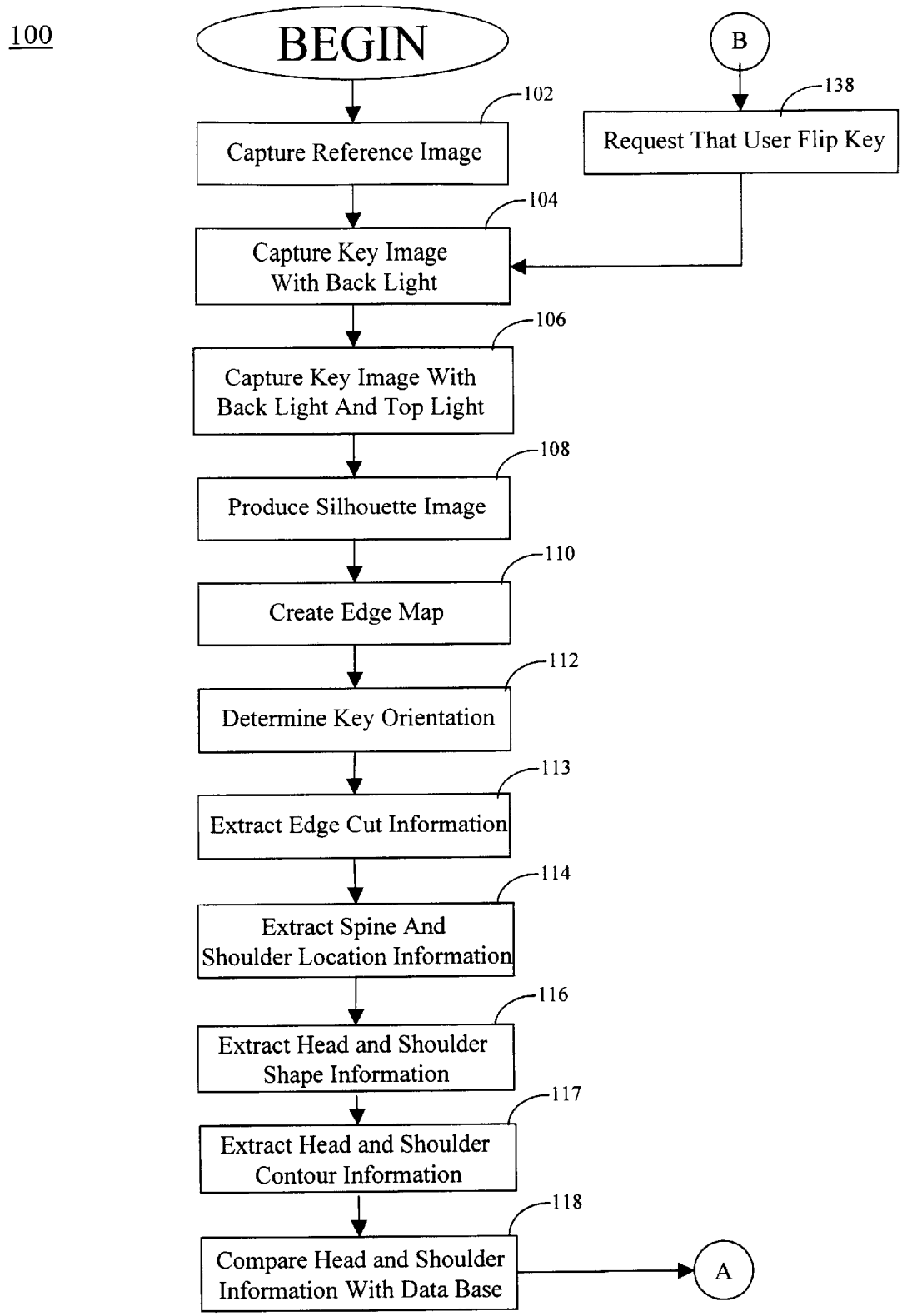
FIGS. 10a and 10b are a flowchart illustrating a method of identifying a key blank from a master key in accordance with the present invention.
Figure 10B:
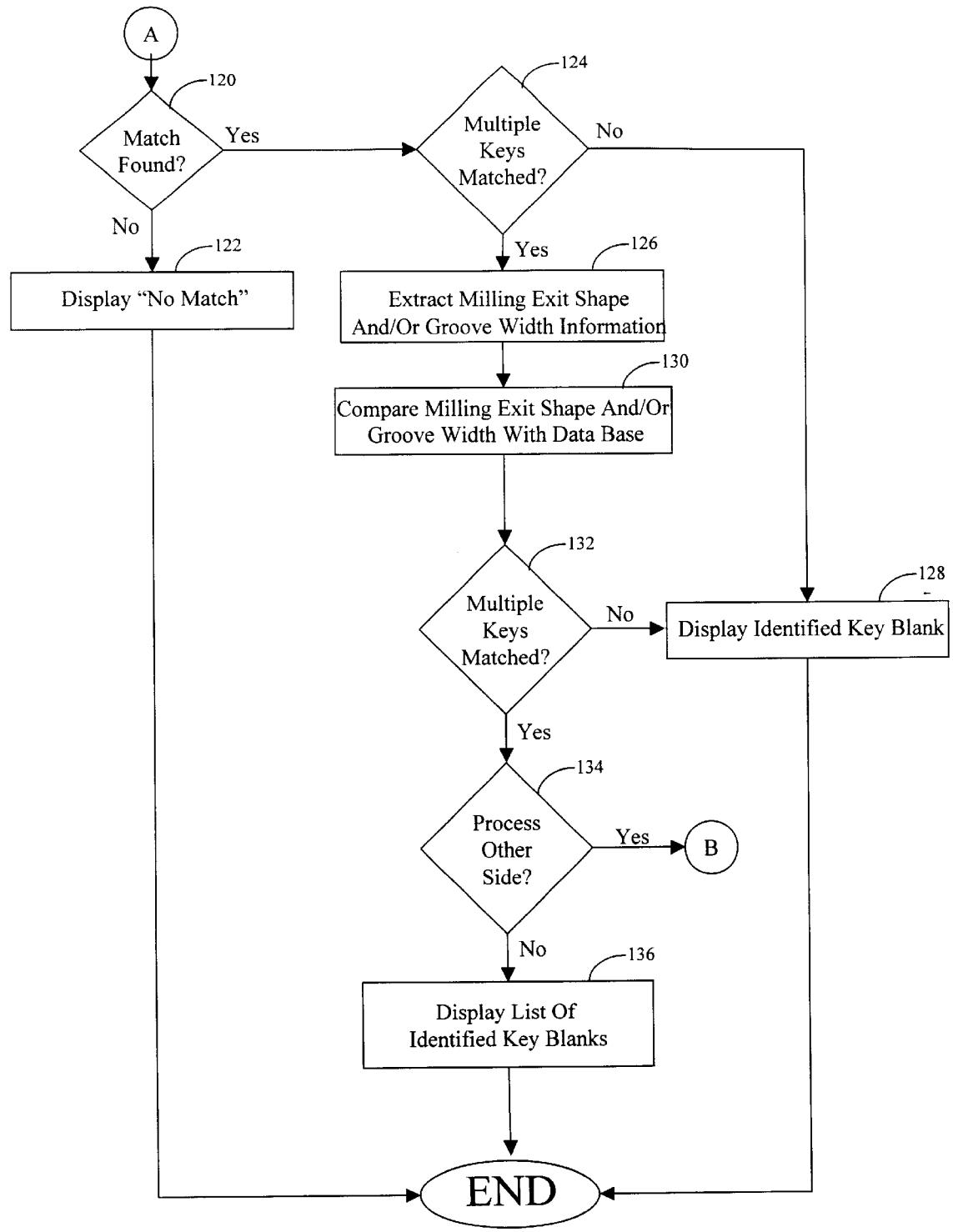

The operation of the key identification system of the present invention will now be described with reference to the accompanying drawings. FIGS. 10a and 10b contain a flow chart of an exemplary process 100 for identifying a master key. Process 100 may be implemented by application 86 (referring to FIG. 9) stored in memory 82 and controlling operation of processor 90.

When the identification system is activated, the control undergoes an initialization process. As part of this initialization process, first luminous surface 24 is activated without a master key in position for identification. A reference image of the back lighting provided by first luminous surface is captured by receiver 28 (step 102). This image is stored in memory 82 for use as a baseline reference in later processing.

The identification process begins after a master key 32 is placed on first luminous surface 24 and the door of housing 22 is shut. Frame 38 ensures that master key 32 is placed within the viewing area of receiver 28. The closing of the door may initiate the identification process or the user may initiate the identification process by depressing one of buttons 36.

The control then captures two images of the master key. For the first image, the control activates only the first luminous surface, which results in the master key being back lighted. The receiver captures the back lit image of the key (step 104) and the image is stored in memory 82. For the second image, both the first and second luminous surfaces are activated, which results in an illumination, or top lighting, of the unsupported side 46 of master key 32. The receiver captures the top lit image of the master key (step 106) and stores the image in memory 82.

Alternatively, it is contemplated that the control may only capture the top lit image of the master key, without capturing the back lit image. As described in greater detail below, the key blank may be identified based on the top lit image alone. However, as also further described below, comparisons of the master key with known key blanks based on the back lit image can be performed faster than comparisons based on the top lit image. Thus, information obtained from the back lit image may be used to filter out some key blanks before comparing information obtained from the top lit image to increase the speed of the identification process.

Preferably, the control then generates a silhouette image of the master key (step 108). This is accomplished by subtracting the reference image captured during the initialization process from the back lit image of the master key. The result is a silhouette image of the master key.

The control then analyzes the silhouette image of the key to create an edge map of the master key (step 110). The edge map is an array of points that define the relative locations of different points along the edges of the master key. The edge map is stored in memory 82 for further processing. During this process, the control also determines the extreme points of the edge map, which are the points that are furthest to the left, right, top, and bottom of the image.

The extreme points are used to determine the orientation of the key (step 112). The control identifies which of the extreme points are furthest apart. These points represent the tip 62 and the head 64 of the key. The control then analyzes the edge map immediately adjacent to these points to determine the point that represents the tip 62 of the key and the point that represents the head 64 of the key. Once the tip 62 and head 64 of the key are identified, the orientation of the master key 32 relative to first luminous surface 24 can be determined. (Step 112).

The control then analyzes the edge map of the key blade to determine whether the key is single-sided or double-sided (step 113). The control examines the edge map representing both sides of the key blade. The control establishes two points that are a fixed distance apart and computes the slope between these two points. This becomes the reference slope. Next, the control moves one of the end points closer to the other and computes the slope between the new point positions. This is repeated several times and for each occurrence the newly computed slope is compared to the reference slope. Each time the newly computed slope is outside the tolerance of the reference slope, it is counted as a slope variance. If the count of variances exceeds a particular threshold the key blade side is considered to be a cut side. From this process, the control determines if the blade has cuts on a single side or on both sides (i.e. is a single-sided or double-sided key).

Next the control extracts information on the key spine and shoulder location from the edge map (step 114) to determine the blade length L of master key 32. In a single-sided key, the uncut side is considered the key spine. The control first establishes two points on the uncut side that are near one another and computes the slope between these two points. The control next establishes the tip end of the spine by searching the edge map of the key along the uncut edge towards the tip of the key to find the point at which the slope varies from the reference slope of the uncut side. Next, the control locates the head end of the spine by searching the edge map of the key along the uncut edge towards the head of the key to find the point at which the slope of the uncut side. This process also establishes the maximum blade length.

Control must then search the key for a shoulder. This is done by establishing a point perpendicular to the head end of the spine that is on the cut side of the blade. From this perpendicular point control searches the edge map of the cut blade back towards the tip end of the key for a slope deviation that indicates the cut key edge is slanting towards the uncut edge. If this condition is not detected within a specific distance then the previously identified spine head is interpreted as the spine shoulder point 71 of the key. If, however, a slope deviation of a significant value is detected, then a point on the uncut side that is perpendicular to this deviation is interpreted as the spine shoulder point 71. The control then computes the blade length L as the distance between the spine tip and the spine shoulder points.

In a double-sided key, the key spine is identified by locating one point on both sides of the blade that are in the uncut part of the blade. The system can then assume that the area of the blade between the located points and the key head is a straight line. The system determines the distance between the straight lines and identifies the midpoint, or centerline of the key. The system then searches from the tip end of the key to find a point that is on the centerline of the key. The centerline of the key between the tip end and the uncut portion of the key blade is the spine of a double-sided key.

For simplicity, one side of the double-sided key is labeled as the cut side and the other side labeled as the uncut side. The shoulder point 71 of the double-sided key is then determined in a similar manner to the single-sided key. The blade length L of the double-sided key is the distance between the shoulder point 71 and the key tip 62.

Preferably, the system searches the known key blanks in the database to filter out key blanks that have different numbers of cut edges (i.e. are two-sided and the master key is one-sided) and have blade lengths that are outside a certain tolerance of the blade length of the master key. The resulting subset of potential matches is maintained in memory for further comparison.

The system next extracts the head and shoulder shape information (step 116). The head shape of the master key is modeled by determining the width of the head at a series of locations between the shoulder point and the head end of the key. The system smooths out any variations in the head shape through an interpolation or extrapolation method. Preferably, the resulting information about the head shape of the master key are consolidated to both simplify the future matching process and to reduce the size of the shape information. The data groups are consolidated by combining consecutive widths of the same size in to a single width description of both width and count of width occurrences (length). These width descriptions are combined into a single shape description string. This consolidation step reduces the amount of head shape data that must be compared with known key blanks.

The system may also extract contour information about the head and shoulder of the master key (step 117). The contour information is derived from the shape of the outer perimeter of head and shoulder area of the master key. The contour information is extracted by analyzing the slope variances in the shape of the outer perimeter of the head and shoulder area. With reference to FIGS. 11*b* and 11*c*, these slope variances may be denoted as either a slope up 73, a slope down 75, a horizontal 77, or a vertical 79. The slope variances and sizes may then be combined to form the contour description string that identifies the outer perimeter of the shape of the head and shoulder area.

The control then compares the head and shoulder information against the list of possible matches remaining after the edge cut and blade length filter. Preferably, the control first performs a general comparison of the master key head shape of the potential key blank matches and removes those key blanks that are outside of a certain tolerance.

The shape comparison is a process of comparing each width description in the shape description string for the master key with those of the known key blank. Preferably, the similarity of each comparison is assigned a score. If, after the shape description strings are compared, there are any remaining width descriptions for either the master key or the known blank key, the comparison score is reduced accordingly. This comparison process takes into account both the width and the location where the width occurs. The advantage of this process is that both symmetrical and asymmetrical keys can be uniquely identified.

If the shape comparison based on the shape description string fails to produce a score indicative of a match, the control may perform a comparison based on the contour description string for the master key and potential key blank matches. It is contemplated that the contour description matching described below may be performed prior to or instead of the shape description string matching. The contour description matching may be a "pass or fail" type matching process. If the contour description matching process yields a "passing" score, the corresponding key blank is added to the list of possible matches.

A contour description comparison may be appropriate when a key blank is identified as a possible match in that the key blank has the same number of cut sides and a similar blade length to the master key, but the shape description comparison did not yield a significant score. The contour description comparison will determine if the shape description comparison failed to yield a significant score because the length or width of the master key head is greater or smaller than the length or width of the key blank head.

In the contour description comparison, the control first compares the overall size of the contour description string of the master key with the overall size of the contour description string of the key blank. If the difference between the sizes of the two contour description strings is outside of a specific tolerance, the contour description comparison is flagged as a "fail."

If the size difference between the two contour description strings is within the specific tolerance, the control then performs a "step by step" comparison of each slope variance in the two contour description strings. If the first slope variance in the master key contour description string is identical, in terms of slope direction and length, a full score is assigned to the first slope variance.

If, however, there is a difference in the first slope variance in terms of either slope or direction, the control steps through the first slope variance to determine the magnitude of the size difference between the master key and the key blank. If the size difference in the first slope variance is less than the difference in overall size, no penalty is assigned. If, however, the size difference in the first slope variance between the master key and the key blank is greater than the overall size difference in the contour description string, the contour matching score is decreased. The amount that the score is decreased may be related to the magnitude of the size difference between the first slope variance of the master key and the overall size difference between the master key contour description string and the key blank contour.

The control continues this analysis for each slope variance in the contour description string and combines the scores from each slope variance into a contour match sum. When the contour description comparison is complete, the contour match sum is compared to an ideal match score. The ideal match score may be equivalent to the size of the smaller of the two contour strings. If the contour match sum is within a specific threshold of the ideal score, the comparison is flagged as a "pass" and the corresponding key blank is identified as a potential match.

Preferably, the control maintains information about key blanks that are similar to one another. Each time a list of possible matches is generated for a master key, the control ensures that each of the identified key blanks is listed as "similar to" the other key blanks on the list. If one or more of the key blanks identified as a possible match is not listed as similar to the other blank keys on the potential match list, the system updates this information accordingly. In a situation where the control is unable to identify the key blank to a certainty, keys that are "similar to" the master key may be presented to the user to aid in identifying the appropriate key blank.

It is further contemplated that the system may employ a ranking system to identify the key blanks that are most similar to one another. This is accomplished by rating the keys on their similarities and storing this information with the key blank information. When a key blank cannot be identified to a complete certainty, the list of potential matches can be presented to the user in accordance with the assigned "similar to" ranking.

The control then analyzes the key blanks that remain as possible matches at the conclusion of the head and shoulder shape comparison (step 120). See FIG. 10*b*. If the list of matches is empty, meaning that no key blanks were identified as potential matches, then the control displays a suitable message (step 122), such as "No Matching Keys In Database" on LCD display 34. If only a single key blank was identified as a potential match (step 124), this key blank is the key blank corresponding to the master key. The control displays a message on LCD display 34 to identify the matching key blank to the user (step 128).

If multiple keys were identified as potential matches, the control then extracts the milling exit shape from the top lit key image of the master key(step 126). This is accomplished by subtracting the reference image from the top lit image to produce an image of the unsupported (exposed) surface of the master key. The control analyzes the pixels of this image of the master key to identify the milling exit shape 76. As illustrated in FIGS. 11*a*–11*d,* milling exit shape 76 is identified as a "shape string" that represents the line formed on the key where the millings exit the key blade. The control further defines the "shape string" of milling exit shape 76 by normalizing the image gray color on the key blade. This is accomplished by changing the gray values that are not considered to be shadow to consistent fixed gray values. This process allows the control to more easily identify the milling shadows and milling edges.

Preferably, milling exit pattern 76 is defined relative to the location and slope of the spine (as determined above). The shape string formed on the master key will be oriented in one of the following directions: (1) parallel to the spine, (2) perpendicular to the spine, (3) sloped away from the spine, or (3) sloped to the spine. The shape string may therefore be defined by a series of vectors, or data groups, that indicate the length, location, and orientation of the segments that make up the shape edge of the milling exit shape.

The control then compares the data groups defining the milling exit shape string to the stored data groups defining the milling exit shape strings of known key blanks (step 130). The milling exit comparison is accomplished in a manner similar to the head shape comparison process. The control compares each mill shape descriptor of the master key to the mill shape descriptor of the known key blanks and scores the comparison. Score values over a specific threshold are considered to be matched shapes. Preferably, this time-consuming comparison process is performed on only the subset of key blanks that were identified as possible matches in the prior comparisons. It is contemplated, however, that this search may be performed on the entire database of known key blanks. In either approach, the results of the milling exit shape comparison will include a reduced list of key blanks that are identified as possible matches.

Alternatively, the width and location of the milling grooves on the key blade may be used to further discriminate among similarly shaped key blanks. With this approach, the control would first normalize the image gray color of the key blade, in the same manner as described above. This allows the control to more easily identify shadows that are created by the milling grooves.

Referring to FIGS. 11*a*–11*d,* the control identifies a line 81 on the key blade that is perpendicular to the spine of the key. For keys with a shoulder 71 (as illustrated in FIGS. 11*c* and 11*d*), line 81 may be aligned with the shoulder 71. For keys without a shoulder (as illustrated in FIGS. 11*a* and *b*), line 81 may be located an arbitrary distance from the tip of the key.

The control then identifies the light and dark sections along line 81. The widths of each light and dark section are saved as a mill widths shape string. The number of light and dark sections are also stored with the mill widths shape string. As will be apparent, the number of light and dark sections on a particular key blank is related to the number of milling grooves on the key blank. Based on the width of each light and dark section, the control may determine the width of each milling groove.

The control then compares the mill widths shape string of the master key to the known key blanks. First, the control identifies the key blanks that have the same number of light and dark sections. The control then compares the widths of the light and dark sections in the master key mill widths string to the widths of the light and dark sections of the identified key blanks. The light and dark sections on the key blank are matched by size and type (i.e. light or dark) against the master key mill widths shape string. Each section on the key blank that matches the type (i.e. light or dark) of the master key and that has a size that is within a first tolerance level of the corresponding master key section is given a full score. Each matching type section having a size that is between the first tolerance level and a second tolerance level is given a partial score. If the combined score for all widths in the mill width shape string is outside of a specific threshold, the key blank is removed from the list of possible matches.

If only a single key blank is identified as a match (step 132), this key blank is the key blank that corresponds to the master key. The control then displays an identification of the matching key blank on LCD display 34 for the user (step 128).

If, however, more that one key blank remains on the list of possible matches, the opposite side of the master key may need to be examined (step 134). The key blanks remaining as possible matches for the master key are analyzed to determine if the opposite side of the key blank has millings that will further distinguish between the key blanks. If the remaining key blanks are not capable of being further distinguished by additional millings on the opposite side of the key, the identification process is complete and the control identifies each of the key blanks remaining as a possible match to the user via LCD display 34 (step 136).

It is contemplated that the control may determine whether there is useful information on the opposite side of master key in a variety of manners. For example, an indicator may be updated when information about a particular key blank is stored in the database. When the information about the key blank is loaded, a determination is made as to whether the key blank has unique milling patterns on both sides. If so, the indicator in the database is marked accordingly. The control checks this indicator to determine if the key should be flipped to obtain additional information.

Alternatively, the control may examine the milling shape strings for the opposite side of the key blanks. This comparison will determine whether the opposite side of the key blanks are different from one another. If there is a difference between the milling patterns on the opposite side of the different key blanks, then additional distinctions can be made between the key blanks and the key should be flipped to obtain the additional information. If there is no difference in the opposite side of the key blanks, the step of flipping the key for additional analysis is not necessary.

If the control determines that the key blanks may be further differentiated by millings on the opposite side of the master key, the control instructs the user to flip the key over so that the opposite side of the key is exposed to the view of receiver 28 (step 138). After the user flips the master key and recloses the door of housing 22, the control proceeds with either the full identification process of the opposite side of the key or some subset thereof. For example, it is contemplated that this process may include both the steps of back lighting and top lighting. Or, alternatively, the identification process may resume with only the top lighting step to determine the milling exit pattern on the opposite side of the key.

The present invention contemplates that the disclosed key identification system may be used in conjunction with a key cutting machine. The control may perform the additional step of analyzing the edge map of the key to determine the key cut codes for the blade of the key. The key cut codes define the location, depth, and, angle of the cuts in the master key blade. The key cut codes may be stored in memory 82, displayed on LCD display 34, or sent to the key cutting machine. The key cut codes may be transmitted to the key cutting machine via a direct connection or over a network. Alternatively, after the system of the present invention identifies the correct key blank, that blank can be cut to correspond to the master key through known tracing techniques.

The present invention, therefore, provides a key identification system that is less complex and easier to use than conventional key identification systems. The system described herein uniformly illuminates the surface of the master key, without the interference of shadows or glares, and provides for an accurate identification of the key. In addition, the comparison algorithms of the present invention provide for a quick identification of the master key. It is expected that the comparison process for a database of 1,000 keys may be performed by the system of the present invention in under a second. The compact data structures of known key blanks also allows the entire system to be self-contained, without the need for external data storage devices.

It will be apparent to those skilled in the art that various modifications and variations can be made in the assembly of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for identifying a key blank from a master key, the system comprising:
   a housing;
   a first source of uniform light configured to backlight a first surface of a master key, the first source of uniform light being fixed relative to the housing;
   a second source of uniform light configured to illuminate a second surface of a master key opposite the first surface, the second source of uniform light being fixed relative to the housing and the first source of uniform light, and disposed opposite the first source of uniform light such that the master key is disposable therebetween, the first and second sources of uniform light operable to generate an image of the master key;
   a receiver operable to capture the image of the master key; and
   a control having a memory configured to store information on a plurality of key blanks, the control operable to identify the key blank corresponding to the master key based on the captured image.

2. The system of claim 1, wherein the receiver is disposed opposite the key from the first source of uniform light, such that the first source of uniform light generates a silhouette of the master key.

3. The system of claim 2, wherein the second source of uniform light illuminates an unsupported surface of the master key.

4. The system of claim 1, wherein the amount of light generated by each of the first and second sources of uniform light is variable.

5. The system of claim 1, wherein the first source of uniform light is a first luminous surface and the second source of uniform light is a second luminous surface.

6. The system of claim 1, wherein the housing substantially encloses the first and second sources of uniform light and the receiver.

7. A method of identifying a key blank from a master key, comprising the steps of:
   providing a housing having a first source of uniform light configured to illuminate a first surface of a master key and a second source of uniform light configured to illuminate a second surface of the master key opposite the first surface, each of the first and second sources of uniform light being fixed relative to the housing and to the other of the first and second sources of uniform light;
   positioning the master key between the first source of uniform light and the second source of uniform light;
   backlighting the first surface of the master key with the first source of uniform light;
   illuminating the second surface of the master key with the second sources of uniform light;
   capturing the image of the master key generated by the one of the first and second sources of uniform light; and
   comparing the captured image of the master key with information from known key blanks to identify a key blank corresponding to the master key.

8. The method of claim 7, further including the step of identifying the location and width of at least one groove on the illuminated side of the master key from the captured image.

9. The method of claim 8, wherein the step of comparing includes a comparison of the location and width of the at least one groove with the information from known key blanks.

10. The method of claim 8, further including the step of identifying the location and width of each groove on the illuminated side of the master key from the captured image.

11. The method of claim 10, wherein the step of comparing includes a comparison of the location and width of each groove on the illuminated side of master key with the information from known key blanks.

12. The method of claim 7, further including the step of extracting an image of a milling exit pattern from the illuminated side of the master key.

13. The method of claim 12, wherein the step of comparing includes a comparison of the image of the milling exit pattern of the master key with the information from known key blanks.

14. The method of claim 7, further comprising the step of extracting information about the shape of a head portion of the master key.

15. The method of claim 14, further comprising the step of extracting a shape description string defining the shape of the head portion of the master key from the image of the master key.

16. The method of claim 15, wherein the shape description string is extracted by identifying the width of the head portion of the master key at a plurality of locations.

17. The method of claim 16, wherein the step of comparing includes a comparison of the shape description string of the master key with the information from known key blanks.

18. The method of claim 14, further comprising the step of extracting a contour description string defining an outer perimeter of the head portion of the master key from the image of the master key.

19. The method of claim 14, wherein the contour description string is extracted by identifying slope variances in the outer perimeter of the head portion of the master key.

20. The method of claim 19, wherein the step of comparing includes a comparison of the contour description string of the master key with the information from known key blanks.

* * * * *

UNITED STATES PATENT AND TRADEMARK OFFICE
CERTIFICATE OF CORRECTION

PATENT NO. : 6,836,553 B2  
DATED : December 28, 2004  
INVENTOR(S) : John Campbell et al.

It is certified that error appears in the above-identified patent and that said Letters Patent is hereby corrected as shown below:

Column 15,
Line 43, "light, and" should read -- light and --.

Column 16,
Line 16, "sources" should read -- source --.

Signed and Sealed this

Twenty-second Day of March, 2005

JON W. DUDAS
*Director of the United States Patent and Trademark Office*